No. 737,285. PATENTED AUG. 25, 1903.
C. B. SCHOENMEHL.
BATTERY ELEMENT.
APPLICATION FILED MAY 19, 1902.
NO MODEL.
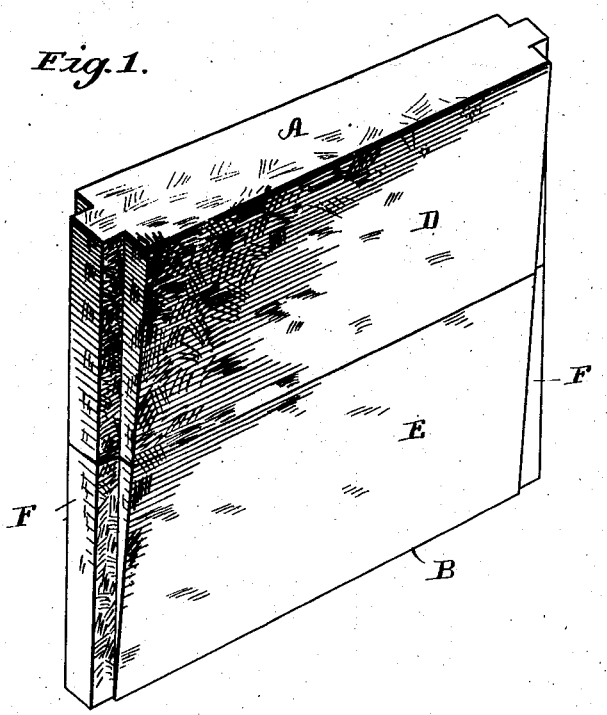
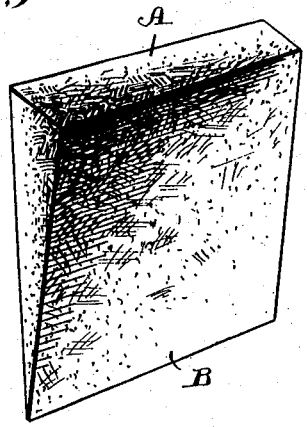
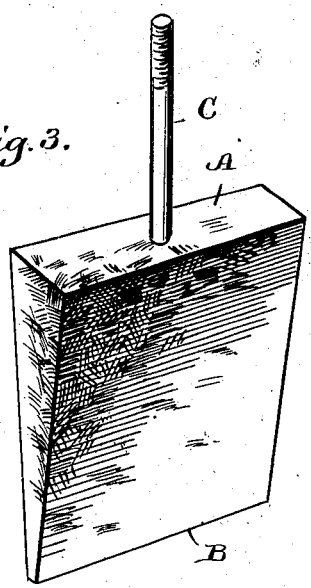
Witnesses
W. V. Devitt
A. L. De Laney
Inventor
Charles B. Schoenmehl
By Chamberlain & Newman
Attorneys No. 737,285. Patented August 25, 1903.

UNITED STATES PATENT OFFICE.

CHARLES B. SCHOENMEHL, OF WATERBURY, CONNECTICUT.

BATTERY ELEMENT.

SPECIFICATION forming part of Letters Patent No. 737,285, dated August 25, 1903.

Application filed May 19, 1902. Serial No. 107,955. (No model.)

*To all whom it may concern:*

Be it known that I, CHARLES B. SCHOENMEHL, a citizen of the United States, and a resident of Waterbury, in the county of New Haven and State of Connecticut, have invented certain new and useful Improvements in Battery Elements, of which the following is a specification.

My invention relates to galvanic batteries, and especially to depolarizing elements therefor, which may consist of any suitable material that can be worked in the desired manner and to the form and degree of hardness required.

It will be obvious to those skilled in the art that my element referred to is adapted for use in the common forms of both closed or open circuit-batteries, wherein my element constitutes one electrode, while suitable zinc plates serve as the other. A caustic solution may be used as the conducting medium, which, together with the electrode mentioned, is retained in a suitable jar. (Not shown.)

It is the object of my invention to, first, provide a negative element for batteries that can be employed direct without the necessity of a special receptacle to retain said element, and, second, to provide and form such elements so as to get the greatest amount of power and life out of the same and to insure the element retaining a uniform voltaic power, and to accomplish the above by producing an element which is larger or thickest through its top end where the solution is strongest and smallest at the bottom where the solution is weakest, in this way securing the full amount of energy or power from the element, as is particularly desirable in batteries of this class.

With the above objects in view my invention resides and consists in the novel construction and formation of an element, as shown upon the accompanying sheet of drawings, forming a part of this specification, upon which similar letters of reference denote like or corresponding parts throughout the several figures, and of which—

Figure 1 is a perspective view of an element made of two plates, one above the other, and embodying my invention. Fig. 2 is a perspective of a slightly modified form of my invention, embodying a single plate substantially wedge shape; and Fig. 3 is a similar view, the element, however, being provided with a suspending-rod for attachment to a cover.

While the individual shapes of the several forms of the invention differ somewhat, the broad principle is clearly embodied in all of them. Consequently I do not care to limit myself to any of the particular forms shown, since the invention is broader than that of the particular design or shape illustrated, as will later be more fully explained.

My element is preferably formed of oxid of copper, which is first mixed with suitable solutions and then compressed or molded into solid special plate forms. The bulk of the material on these plates is thrown to the top edge, as at A, leaving a narrow or thin edge at the bottom, as at B, forming a wedge-shaped element, the side walls of which are at an angle other than a right angle to a vertical line therethrough. After the elements are molded they are solidified by being compressed and baked.

The electrode may be made double, as shown in Fig. 1, or single, as shown in Figs. 2 and 3. The "double electrode," so called, comprises two beveled plates, one above the other, the top one D being the thickest and the lower one E the thinnest, each tapering from top to bottom, and the two forming a single uniform taper or wedge shape throughout their combined length from top to bottom, thus producing the desired bulk of material at the top in line with the upper and stronger stratas of solution in the battery. The plates shown in Fig. 1 are provided with vertical ribs F which adapt them for use in a frame, (not shown,) having vertically-disposed grooves; or, if preferred, the elements can be provided with a suspending-rod C, as shown in Fig. 3, which would serve to support them from a cover or bridge attached to the battery-jar. With an element of this sort the surface may be reduced to a metallic state, if desired, which is equivalent to a plating of copper, which makes them more conductive and gives them a more substantial and desirable appearance.

A solidified element of this sort can be inserted or removed from a battery-jar easier and with less annoyance and inconvenience than any of the forms wherein a granulated electrode is employed within a receptacle which is difficult to clean in recharging. Its further and more important advantage, as originally outlined, is that of providing a solidified element larger at the top than at the bottom to insure its entire consumption and a uniform throw of energy.

I do not wish to be limited to the exact shape of element shown in Fig. 3, inasmuch as it is equally within my contemplation to employ a large upper plate of uniform thickness and a lower and smaller plate of uniform but less thickness, thereby, in a measure, accomplishing the same result.

Having thus described my invention, what I claim, and desire to secure by Letters Patent, is—

1. A battery element, comprising a solidified and hardened flat depolarizer-plate, broadest through its top edge.

2. A negative electrode for a battery, comprising a substantially flat solidified copper oxid brick, widest through its top edge.

3. A battery element consisting of a depolarizer, broadest through its top edge and comprising a solidified and pressed plate of oxid of copper.

4. A negative element for a battery comprising a solidified plate tapering from top to bottom and being of a greater thickness through its upper edge than the lower.

5. A negative element for a battery comprising a solidified plate tapering from top to bottom, being of a greater thickness through the top edge than the lower, and having ribs on its edges.

6. A negative element for a battery, comprising a compressed plate of oxid of copper, the same being thicker through the top than the bottom.

7. A negative element for a battery, comprising a flat solidified depolarizer-plate broadest through its top edge, and means for supporting the same from the cover or bridge of the battery-jar.

8. A negative element for a battery, comprising a compressed plate of oxid of copper having its side walls at an angle other than a right angle to a vertical line through the element.

9. A negative element for a battery composed of a copper oxid plate, solified, molded and baked to a form that is thicker through the top edge than the bottom.

10. A negative element for a battery comprising copper oxid, solidified and molded to a form which is thicker through the top than the bottom and its exterior surface reduced to a metallic state.

11. A battery element comprising one or more solidified depolarizing-plates located one above the other, the uppermost one being thicker than the lower one.

12. A negative element for a battery comprising compressed plates of oxid copper arranged above each other, the uppermost one being thicker than the lower one.

13. A negative element for a battery comprising one or more compressed depolarizer-plates arranged above each other and being larger at the top than the bottom.

Signed at Bridgeport, in the county of New Haven and State of Connecticut, this 14th day of May, A. D. 1902.

CHARLES B. SCHOENMEHL.

Witnesses:
C. M. NEWMAN,
ALEX L. DE LANEY.